United States Patent
Maljean

(10) Patent No.: US 11,313,282 B2
(45) Date of Patent: Apr. 26, 2022

(54) HYBRID TRANSMISSION TURBOJET ENGINE

(71) Applicant: SAFRAN AERO BOOSTERS SA, Herstal (BE)

(72) Inventor: Stephane Maljean, Othée (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 0 days.

(21) Appl. No.: 16/758,749

(22) PCT Filed: Jun. 21, 2019

(86) PCT No.: PCT/EP2019/066434
§ 371 (c)(1),
(2) Date: Apr. 23, 2020

(87) PCT Pub. No.: WO2019/243558
PCT Pub. Date: Dec. 26, 2019

(65) Prior Publication Data
US 2020/0340406 A1    Oct. 29, 2020

(30) Foreign Application Priority Data

Jun. 22, 2018 (BE) .................................. 2018/5439

(51) Int. Cl.
*F02C 7/36* (2006.01)
*F01D 15/10* (2006.01)
(Continued)

(52) U.S. Cl.
CPC ................ *F02C 7/36* (2013.01); *F01D 15/10* (2013.01); *F02C 3/067* (2013.01); *H02K 7/116* (2013.01);
(Continued)

(58) Field of Classification Search
CPC .. F02C 7/36; F02C 3/067; F01D 15/10; F05D 2220/323; F05D 2220/36; F05D 2220/76; F05D 2260/40311
See application file for complete search history.

(56) References Cited

U.S. PATENT DOCUMENTS 6,895,741 B2 * 5/2005 Rago ...................... F01D 15/10
60/226.1
2004/0255590 A1 * 12/2004 Rago ........................ F02C 7/32
60/772
(Continued)

FOREIGN PATENT DOCUMENTS

DE    102014218539 A1    3/2016
EP        2728140 A2    5/2014
(Continued)

OTHER PUBLICATIONS

International Search Report dated Sep. 5, 2019 for Parent PCT Appl. No. PCT/EP2019/066434.

*Primary Examiner* — Shafiq Mian
(74) *Attorney, Agent, or Firm* — James E. Walton

(57) ABSTRACT

A turbojet engine (2), such as an aircraft turbojet engine, comprising: an epicyclic gear train (36); a turbine rotating a transmission shaft (34) constrained to rotate with the inner planetary gear (60) of the epicyclic gear train (36); a fan (18) rigidly connected to the ring gear (66) of the epicyclic gear train (36); and an electric machine (70) comprising a rotor (72) and a stator (74), the rotor (72) being rigidly connected to the planet carrier (68) of the epicyclic gear train (36). Alternatively, the fan (18) is rigidly connected to the planet carrier and the electric machine (70) is rigidly connected to the ring gear. The invention also relates to methods for using said turbojet engine, in particular for controlling the reduc-
(Continued)

tion ratio between the transmission shaft and the turbine, in order to recover kinetic energy or for taxiing.

15 Claims, 3 Drawing Sheets

(51) Int. Cl.
    *F02C 3/067*     (2006.01)
    *H02K 7/116*     (2006.01)

(52) U.S. Cl.
    CPC .... *F05D 2220/323* (2013.01); *F05D 2220/36* (2013.01); *F05D 2220/76* (2013.01); *F05D 2260/40311* (2013.01)

(56) References Cited

U.S. PATENT DOCUMENTS

| | | | |
|---|---|---|---|
| 2010/0326050 | A1 | 12/2010 | Schilling et al. |
| 2016/0258324 | A1* | 9/2016 | Cigal ................... F16H 57/0439 |
| 2016/0369702 | A1* | 12/2016 | Otto ...................... F04D 25/028 |
| 2018/0266329 | A1* | 9/2018 | Mackin .................. H02K 7/116 |
| 2018/0372005 | A1* | 12/2018 | Venter ........................ F02C 7/32 |
| 2019/0383157 | A1* | 12/2019 | Kupratis ................. F01D 15/10 |
| 2020/0003126 | A1* | 1/2020 | De Wergifosse ..... F16H 37/065 |

FOREIGN PATENT DOCUMENTS

| | | |
|---|---|---|
| WO | 2015065720 A1 | 5/2015 |
| WO | 2018063610 A1 | 4/2018 |

* cited by examiner

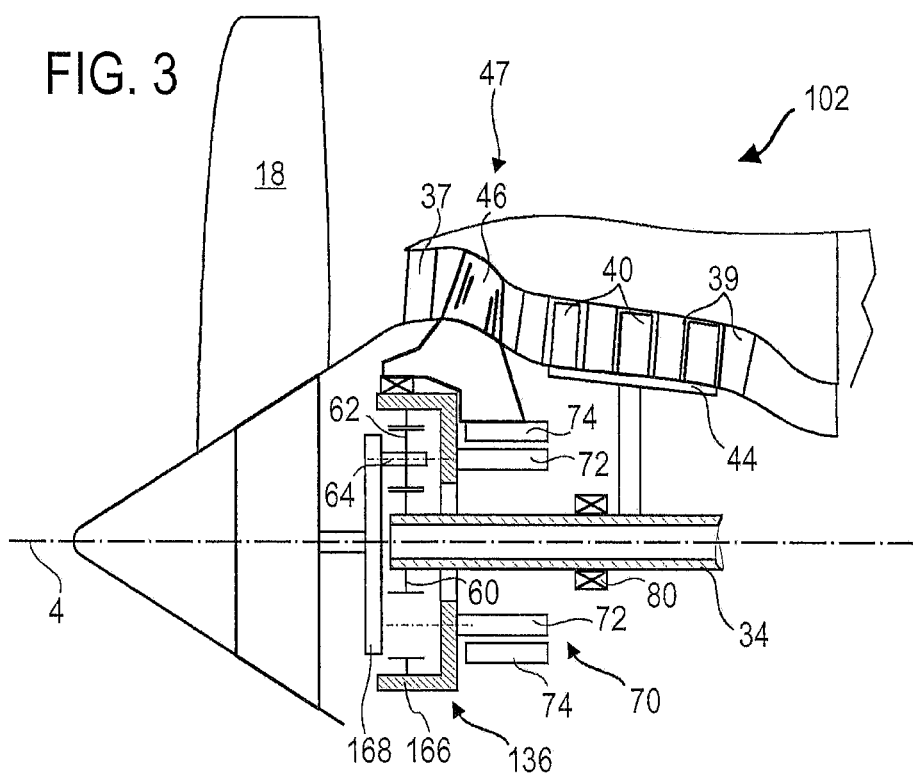
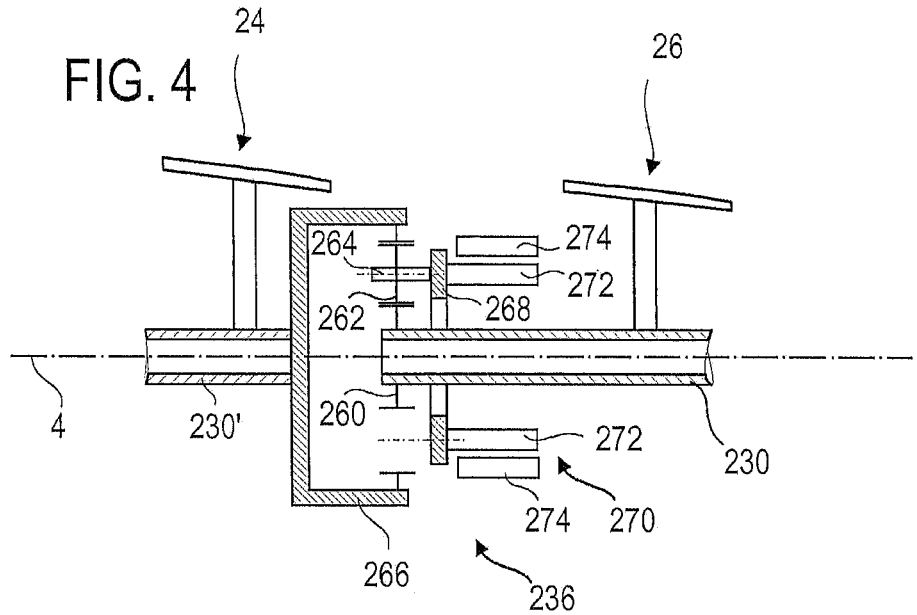

HYBRID TRANSMISSION TURBOJET ENGINE

TECHNICAL FIELD

The invention relates to the design of a turbine engine, in particular an aircraft turbofan with a fan driven by a reduction gear or an aircraft turboprop. The invention also relates to methods of using such a turbine engine.

BACKGROUND ART

Document US 2010/0326050 A1 describes a turbine engine with a compressor with counter-rotating rotors. A transmission shaft drives the fan and the first rotor blades (noted 17 in FIG. 2 of the document cited above). Sprockets whose axes are fixed relative to the casing ensure the transfer of rotational energy to second rotor blades (65) which rotate in the opposite direction to the first blades. An electric generator is provided, an internal rotor is integral with the first blades and an external rotor is integral with the second blades, so as to produce an electric current resulting from the rotation of the transmission shaft. If this design makes it possible to transform mechanical energy into electrical energy, it is not possible to re-inject electrical energy into the mechanical energy necessary for the flight of the aircraft. Thus, since the sprockets have fixed axes, the reducer has an invariable reduction ratio. The design of such a turbine engine can therefore be improved in terms of energy consumption, the type of energy that can be used and/or its flexibility of use.

SUMMARY OF THE INVENTION

Technical Problem

The purpose of the invention is to provide a turbine engine which consumes less fossil energy than known turbine engines. More specifically, the invention aims to promote flexible use of the energies which can supply the turbine engine and aims to optimize the use of these energies according to the conditions of use of the turbine engine.

Solution

The subject of the invention is an aircraft turbine engine, comprising: an epicyclic gear; a turbine driving in rotation a transmission shaft integral in rotation with the sun gear of the epicyclic gear; a fan integral with the outer ring of the epicyclic gear; and an electric motor comprising a rotor and a stator, the rotor being integral with the planet carrier of the epicyclic gear, and the axis of rotation of the rotor of the electric motor being coincident with the axis of rotation of the transmission shaft.

Alternatively, the invention also relates to an aircraft turbine engine, comprising: an epicyclic gear; a turbine driving in rotation a transmission shaft integral in rotation with the sun gear of the epicyclic gear; a fan integral with the planet carrier of the epicyclic gear; and an electric motor comprising a rotor and a stator, the rotor being integral with the outer ring of the epicyclic gear, and the axis of rotation of the rotor of the electric motor being coincident with the axis of rotation of the transmission shaft.

According to advantageous embodiments, the turbine engine can comprise one or more of the following characteristics, taken in isolation or according to all the possible technical combinations:

means for varying the speed and the direction of rotation of the rotor of the electric motor. These means can include electrical circuits such as rectifiers, variators, inverters, etc. These means can also be mechanical, such as a belt variator, a motor shaft output pinion, etc.;

a low-pressure compressor and a high-pressure compressor, the low-pressure compressor being driven in rotation directly by the drive shaft and the high-pressure compressor being driven in rotation by the drive shaft via a reduction gear;

the reduction gear is such that the rotors of the compressors rotate in opposite directions from one another; each compressor includes a flow straightener arranged downstream of an annular row of rotor blades, the flow straightener being possibly made of blades rotating in opposite directions to the rotor blades;

at least one compressor fitted with counter-rotating rotor blades, at least one row of rotor blades being driven by the drive shaft and at least one row of rotor blades being driven in the opposite direction by the electric motor;

the stator of the electric motor is integral with the casing of the turbine engine;

mechanical means are provided to secure the rotor to the stator of the electric motor, in particular a brake clutch. Alternatively, electromagnetic fingers can penetrate housings provided for this purpose;

a low-pressure turbine and a high-pressure turbine, the drive shaft secured to the sun gear being driven by the low-pressure turbine.

The invention also relates to methods of using the turbine engine. These different uses of the same system illustrate different advantageous aspects of the turbine engine according to the invention.

Thus, the implementation of the turbine engine according to the invention can include:

a kinetic energy recovery step during which the electric motor is used as a generator. Indeed, the electric motor and the associated electronic control means allow the electric motor to operate as a generator and therefore to deliver electrical energy to batteries or to instruments or apparatus onboard the aircraft;

a step of regulating the speed and the direction of rotation of the electric motor in order to obtain, from a measured speed of rotation of the transmission shaft, a reference speed of rotation of the fan. A feedback loop provides the desired speed for the fan (responsible for about 80% of the aircraft thrust) regardless of the speed of the drive shaft.

a step of regulating the torque delivered by the electric motor in order to obtain, from a measured torque of the transmission shaft, a target torque of the fan. In the same way as for speed, the electric motor can be torque controlled. Torque can be considered negative when the engine is operating as a generator;

a mechanical blocking step of the electric motor. The electric motor can be blocked, preferably by mechanical means. In other words, its rotor is kept fixed and integral with the stator. This has the consequence of operating the epicyclic gear as a simple gear reducer. Depending on whether the fan is secured to the axes of the planets or to the outer ring, the fan will rotate in the opposite direction or in the same direction as the transmission shaft;

a maintenance step during which the fan is kept stationary and the turbine is rotated by the electric motor. "Maintenance" is to be understood in the broad sense and includes an inspection, tests, assembly/disassembly of certain turbine engine assemblies, etc. For example, it may be necessary to check that the rotation of the turbine is smooth and therefore driving it directly by the electric motor is possible when the fan is kept stationary. The maintenance of the fan can be carried out manually or using a workshop tool dedicated for this purpose such as for example a mechanically welded structure attached to the blades and fixed to a fixed frame of the workshop;

a rolling step carried out on the taxiway thanks to the rotation of the fan driven only by the electric motor. The transmission shaft or the turbine is equipped with a brake, for example electromechanical, which can be actuated to keep the shaft and the turbine stationary during such rolling on the ground. This avoids pollution from the use of fuel on the tarmac.

In general, the advantageous embodiments of each object of the invention are also applicable to the other objects of the invention. Each object of the invention can be combined with the other objects, and the objects of the invention can also be combined with the embodiments of the description, which in addition can be combined with one another, according to all possible technical combinations, unless the opposite is not explicitly mentioned.

Benefits

The turbine engine of the invention, offers innumerable possibilities for driving the fan. In particular, during certain flight manoeuvres, it may be necessary to quickly change the speed of the fan. A large gradient in the speed of the fan can usually take a long time, in particular because of the inertia of the rotating assembly. The turbine engine according to the invention makes it possible, when the electric motor is controlled appropriately, to overcome this inertia and therefore to make the controls of the device more responsive. In addition to the advantages over fossil fuel consumption, the turbine engine according to the invention therefore potentially improves aircraft safety.

BRIEF DESCRIPTION OF THE DRAWINGS

FIG. 3 shows part of a turbine engine according to a second embodiment of the invention;
FIG. 4 illustrates part of a turbine engine according to a third embodiment of the invention.

DETAILED DESCRIPTION OF PREFERRED EMBODIMENTS

In the description that will follow, the terms "internal" (or "inside") and "external" (or "outside") refer to a positioning in relation to the rotational axis of the turbofan. The axial direction corresponds to the direction along the rotational axis of the turbofan. The radial direction is perpendicular to the rotation axis. Upstream and downstream are a reference to the main flow direction of the flow in the turbofan. The term "fixed" is to be understood as attached in rotation, and in particular rigidly linked.

The expression "compressor rotates" or any equivalent expression is a short wording for "the rotor of such a compressor is in rotational motion". Similarly, the speed of rotation of the electric motor refers to the rotational speed of the rotor of the electric motor.

The figures represent the elements in a schematic way, especially without the assembling or sealing elements.

Figure 1:
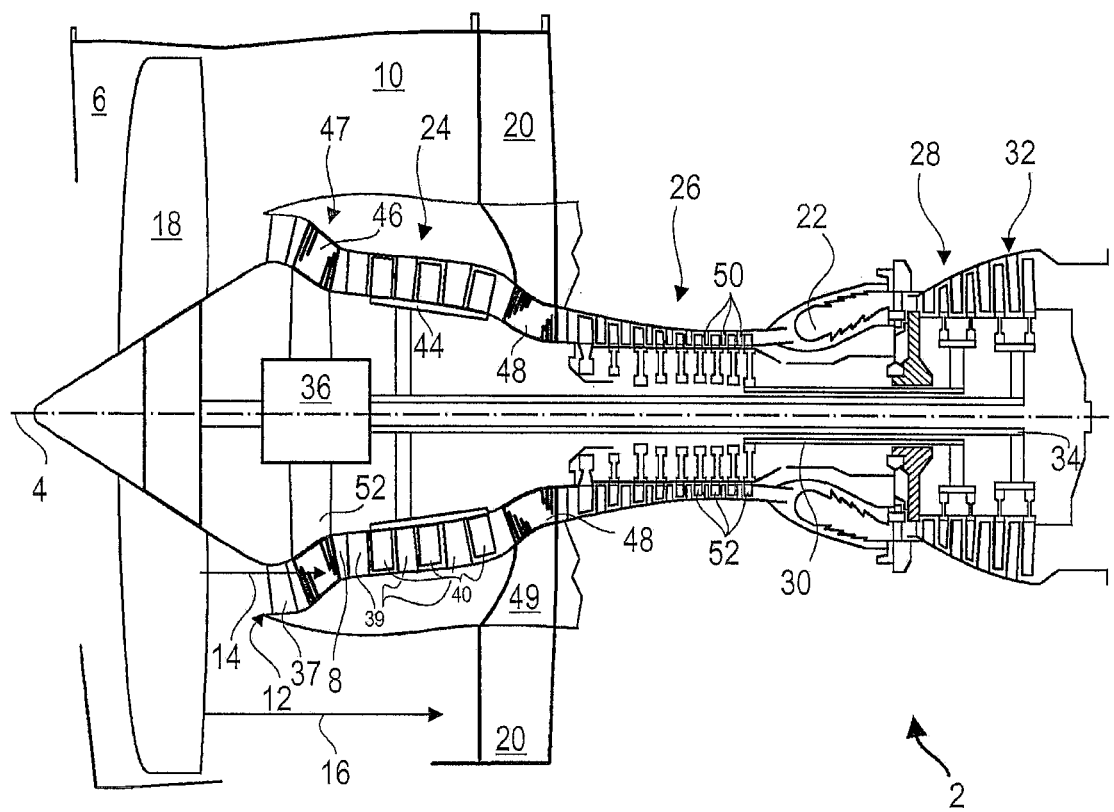
FIG. 1 shows a turbine engine according to the invention.

FIG. 1 represents a double flow turbofan. The turbofan 2 has a rotation axis 4 that can also form an axis of axial symmetry. Turbofan 2 has an annular inlet 6 dividing into a primary passage 8 and a secondary passage 10 thanks to a circular 12-shape separation beak. These passages 8 and 10 are used by, respectively, a primary flow 14 and a secondary flow 16, which meet at the exit of the turbofan. Primary flow 14 and secondary flow 16 are coaxial to one another and ring-shaped.

Secondary flow 16 is accelerated by a fan 18, particularly arranged in inlet 6, so that a thrust reaction can be generated. It can be used for the fly of an aircraft. Diffuser blades 20 can be placed in secondary passage 10 and configured to increase the axial component of secondary flow speed. The fan can be arranged upstream of primary passage 8 and secondary passage 10, especially at axial distance from these passages.

Alternatively, the fan may be not covered by a casing, for example with a counter-rotative double rotor. It can be placed around the primary passage.

Turbofan 2 includes a compression zone, a combustion chamber 22 and a turbine zone of primary flow 14. The compression zone is formed by two compressors, including an upstream compressor 24 and a downstream compressor 26. The downstream compressor 26, also called a high-pressure compressor, can be placed at an entrance to the combustion chamber 22.

Downstream of combustion chamber 22, turbofan 2 can have a high-pressure turbine 28 coupled with a high-pressure shaft 30, then a low-pressure turbine 32 coupled with a low-pressure shaft 34. Shafts 30, 34 can rotate at different speeds from each other and be arranged one in another. These turbines 28, 32 can form the turbine zone of primary flow 14.

The rotors of compressors 24, 26 can be attached to the respective shafts 30, 34 via flanges or discs.

In operation, the mechanical power received from turbines 28, 32 is transmitted through shafts 30, 34 in order to set the compressors 24, 26 in motion. These have several rows of rotor blades associated with rows of stator blades. The rotation of the rotors around their axis of rotation 4 allows to generate an air flow and gradually compress the air flow unto the entrance to the combustion chamber 22.

The fan 18 rotates by means of a gearing, such as an epicyclic gear 36 that will be described in more detail below. Thus, there is no need to provide three turbines to drive the two compressors 24, 26 and the fan 18 at three different rotational speeds.

At the entrance to passage 8, there is an annular first row of 37 stator blades near the nose 12.

The 24 low-pressure compressor includes stator blades 39 and rotor blades 40 interposed between the 39 stator blades. Compressor 24 can optionally end with two successive rows of stator blades 39.

In a variant embodiment that is not illustrated, at least one of the stator rows of blades 39 is replaced by a row of counter-rotating rotor blades, that is to say in rotating in a direction of rotation opposite to the rotating direction of the blades 40. The rotor blades 40 can be supported by a rotor 44 which can be secured to the shaft 34.

The stator of the turbine engine 2 can comprise several support casings, including an upstream casing 47 and a downstream casing 49 arranged on either side of the low-pressure compressor 24, also called intermediate casing. These casings 47, 49 may comprise annular passages forming axial sections of the primary passage 8. They may have substantially radial support arms (called "struts") 46, 48 crossing radially the passage 8. The annular passages may have goose neck profiles. They can mark reductions in the diameter of the primary passage 8, as can its progressive convergence.

The upstream casing 47 and its arms 46 can support the reduction gear 36. It can also support one or more bearings to support in rotation, the fan 18, the shaft 34, or rotating parts of the reduction gear 36. Downstream of the arms 48 is the high-pressure compressor 26 provided with stator 50 and rotor 52 blades. The latter being driven in rotation by means of the shaft 30. In other embodiments, the rotor blades of the high compressor pressure 26 can be driven by the shaft 34 or the rotor of the low-pressure compressor 28, possibly via a reducer.

Figure 2:
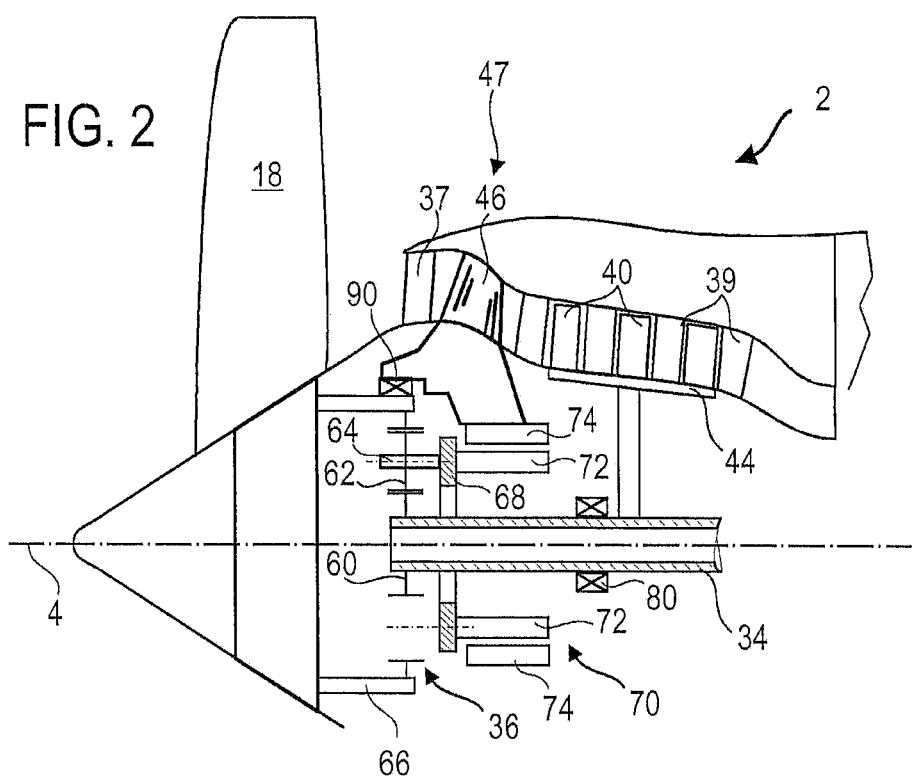
FIG. 2 represents part of the turbine engine according to a first embodiment of the invention.

FIG. 2 illustrates an enlarged part of the turbine engine 2 of FIG. 1, with a focus on the reduction gear 36, in a first embodiment. The reduction gear 36 comprises a sun gear 60 secured to the transmission shaft 34. Planet gears 62 of which only one is visible in the section of FIG. 2 mesh with the sun gear 60. The planets 62 can have a double rotation movement, around their axes 64 and around axis 4. For the sake of simplicity, in this patent application we will refer to axis 64 to designate both the geometric axis of axial symmetry of a planet 62 and the physical pin or pawn, around which planet 62 revolves.

An outer ring 66 (also called the outer crown) meshes with the planets 62. In the exemplary embodiment of FIG. 2, the fan 18 fixed to the outer ring 66. The axes 64 are assembled to a planet carrier 68. Thus, when the planets 62 travel through the interplanetary space, the planet carrier 68 turns on its own axis around the axis 4. An electric motor 70 is provided to supply or recover electrical energy to/from the movement of the planet carrier 68. The latter is integral with the rotor 72 of the electric motor 70 while the stator 74 of the electric motor 70 is fixed relative to the casing 47. Through this arrangement, several modes of operation are possible. When the motor 70 is blocked by appropriate means, the gear 36 behaves like a simple reduction gear and the fan 18 rotates at a speed slower than the shaft 34, with a fixed gear ratio and dictated by the ratio of the diameters of the elements of the gear 36. When the motor 70 is not supplied with energy, the rotor 72, driven by the planet carrier 68, turns and the motor 70 generates an electric current.

When the motor 70 is powered, it forces a rotation of the planet carrier 68 at a given speed and in a given direction. This makes it possible to act on the reduction ratio of the gear 36 and therefore to obtain a desired speed of the fan 18 irrespective of the speed of the shaft 34. The reduction ratio of the gear 36 is therefore continuously adjustable.

Adapted bearings 80, 90 can support the shaft 34 and the outer ring 66 in rotation. The casing 47, via an adapted design of flanges makes it possible to contain these bearings 80, 90.

FIG. 3 represents a turbofan 102 according to a second embodiment of the invention. Only the elements which are different from the embodiment of FIG. 2 have a referral number that is incremented by 100.

The epicyclic gear 136 is composed of a sun gear 60, planets 62 having axes 64, a planet carrier 168 and an outer ring 166. In this embodiment, the rotor 72 is integral with the outer ring 166 and the fan 18 is integral with the planet carrier 168.

The operation and the flexibility of operation of the system are identical to those of the design in FIG. 2. Only the reduction ratios are different since the fan 18 is secured to the planet carrier 168 instead of being secured to the outer ring 166.

In the two examples of FIGS. 2 and 3, the motor 70 is coaxial with the axis 4. It is however possible, depending on the available room within the turbine engine, to radially offset the rotor and therefore to connect the planet carrier 68 or the outer ring 166 to the rotor 72 by means of a belt or a gear.

In an embodiment not shown, some blades of the compressor 24, in particular the counter-rotating stator blades may be integral with the rotor 72.

FIG. 4 represents part of the turbine engine 202, in a third embodiment, which can be combined with the other embodiments. In essence, an epicyclic gear 236 connects a transmission shaft 230 driven by the turbine 28 to a secondary transmission shaft 230' which drives the fan. The secondary shaft 230' can play the role of the shaft denoted 34 in FIGS. 2 and 3, directly, or indirectly, via a suitable reduction gear.

The low-pressure compressor 24 is driven by the secondary shaft 230' while the high-pressure compressor 26 is driven by the shaft 230. An electric motor 270 can be provided so that its rotor 272 is secured to the planet carrier 268 of gear 236. According to an operation equivalent to that of gears 36 or 136, the electric motor 270 makes it possible to continuously regulate the speed reduction ratio between the compressors 24, 26 or to recover kinetic energy. The rotor 272 of the electric motor 270 may alternatively be integral with the outer ring 266 of the gear 236.

In an example that is not shown, the shaft 34 secured to the turbine 32 passes through the gear 236 so as to drive the low-pressure compressor 24 and the outer ring of the gear 236. The sun gear 260 is fitted around and freely rotates around the shaft 34, to drive the high-pressure compressor 26. An electric motor can be secured to the planet carrier of gear 236. Alternatively, the engine can be secured to the outer ring of gear 236 and shaft 34 can drive the planet carrier from gear 236. In an example not shown, one of the compressors 24, 26 can be driven by the planet carrier.

By construction of the inter-compressor epicyclic gear, or by controlling the speed and/or the direction of rotation of the electric motor, the compressors' rotors can rotate in opposite directions.

In another embodiment not shown, and combinable with the previous embodiments, an epicyclic gear and optionally an electric motor, according to the same assembly and the same operation as that described above, is/are provided (s) between the two shafts 30, 34 connected to the turbines 28, 32.

Figure 5:
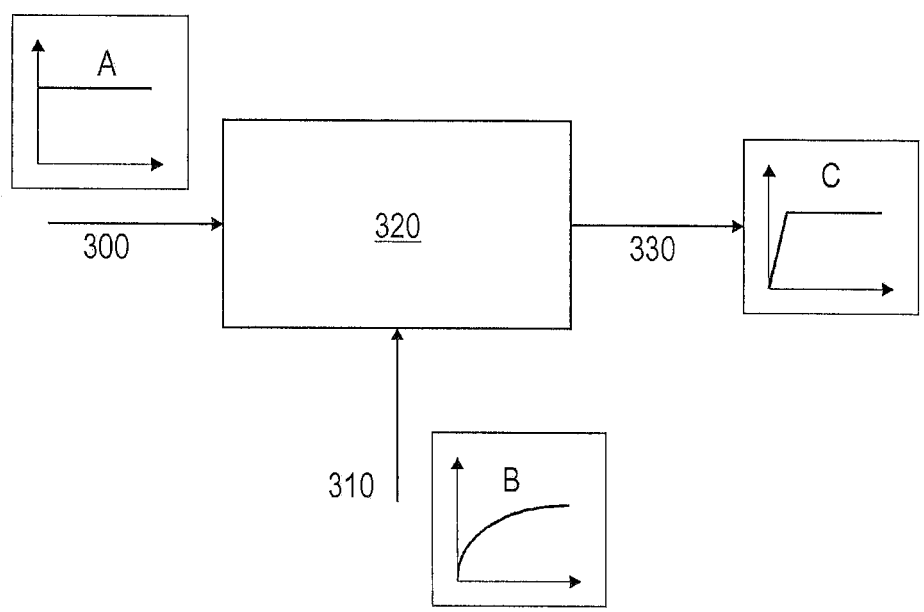
FIG. 5 shows a method according to the invention.

FIG. 5 schematically describes the result of the presence of the electric motor on the speed of the fan 18. A target value 300 is given by a user for the speed or the desired torque of the fan. A measured value 310 of the speed or torque of the shaft 34, 230' is measured in real time. Depending on the ratios of the number of teeth or the diameters of the various elements of the epicyclic gear, a calculation 320 is carried out which dictates the speed or the torque 330 of the rotor 72 of the electric motor 70 which must be aimed at in order to obtain the target value 300, from the measured value 310.

The graphs illustrate, as a function of time, these different values: Graph A illustrates the target value which is a constant value, at least on the time scale in question here. The speed/torque of the turbine increases slowly over time as shown in curve B, induced by the increase in gases and compression. This curve B also illustrates the speed/torque of the fan, for an engine without an electric motor. Curve C is the actual speed/torque of the fan obtained by the action of the electric motor. Thus, the impact of the use of the electric motor is well shown on curve C for which the transient regime is much shorter than for curve B.

The measurement of the speed/torque, and the control of the electric motor is done at any time to change the value 330 according to the progressive changes of the value 310. The value 330 evolves therefore according to curve B towards a stable value.

The invention claimed is:
1. Turbofan engine, comprising:
an epicyclic gear comprising:
   a sun gear;
   an outer ring; and
   at least one planet gear and a planet carrier;
a turbine, driving in rotation a transmission shaft rotationally fixed to the sun gear;
a fan rotationally fixed to the outer ring; and
an electric motor comprising:
   a rotor and a stator, the rotor being rotationally fixed to the planet carrier, the axis of rotation of the rotor of the electric motor being coincident with the axis of rotation of the transmission shaft.
2. The turbofan engine according to claim 1, further comprising:
control means for varying the speed and the direction of rotation of the rotor of the electric motor.
3. The turbofan engine according to claim 1, further comprising:
a low-pressure compressor and a high-pressure compressor, the low-pressure compressor being driven in rotation directly by the transmission shaft and the high-pressure compressor being driven in rotation by the transmission shaft via a gear.
4. The turbofan engine according to claim 3, wherein the gear is a further epicyclic gear.
5. The turbofan engine according to claim 3, wherein the gear is such that the low-pressure compressor and the high-pressure compressor rotate in directions opposite from one another.
6. The turbofan engine according to claim 1, further comprising:
a casing that is stationary;
wherein the stator of the electric motor is integral with the casing.
7. The turbofan engine according to claim 1, further comprising:
a low-pressure turbine and a high-pressure turbine;
wherein the transmission shaft that is integral with the sun gear is driven by the low-pressure turbine.
8. The turbofan engine according to claim 1, further comprising:
a low-pressure compressor and a high-pressure compressor, wherein at least one of the low-pressure compressor and the high-pressure compressor is provided with at least two rows of rotor blades, wherein at least one row of rotor blades is driven in a direction of rotation by the transmission shaft and at least one row of rotor blades is driven by the electric motor in a direction of rotation opposite the direction of rotation of the at least one row of rotor blades driven by the transmission shaft.
9. A turbofan engine, comprising:
an epicyclic gear comprising:
   a sun gear;
   an outer ring; and
   at least one planet gear and a planet carrier;
a turbine, driving in rotation a transmission shaft integral in rotation with the sun gear;
a fan integral with the planet carrier; and
an electric motor comprising:
   a rotor and a stator, the rotor being integral with the outer ring, the axis of rotation of the rotor of the electric motor being coincident with the axis of rotation of the transmission shaft, the turbofan engine further comprising a low-pressure compressor and a high-pressure compressor, the low-pressure compressor being driven in rotation directly by the transmission shaft and the high-pressure compressor being driven in rotation by the transmission shaft via a gear.
10. The turbofan engine according to claim 9, further comprising:
control means for varying the speed and the direction of rotation of the rotor of the electric motor.
11. The turbofan engine according to claim 9, wherein the gear is a further epicyclic gear.
12. The turbofan engine according to claim 9, wherein the gear is such that the low-pressure compressor and the high-pressure compressor rotate in directions opposite from one another.
13. The turbofan engine according to claim 9, further comprising:
a casing that is stationary;
wherein and the stator of the electric motor is integral with the casing.
14. The turbofan engine according to claim 9, further comprising:
a low-pressure turbine and a high-pressure turbine;
wherein the transmission shaft that is integral with the sun gear is driven by the low-pressure turbine.
15. A turbofan engine, comprising:
an epicyclic gear comprising:
   a sun gear;
   an outer ring; and
   at least one planet gear and a planet carrier;
a turbine, driving in rotation a transmission shaft integral in rotation with the sun gear;
a fan integral with the planet carrier;
an electric motor comprising:
   a rotor and a stator, the rotor being integral with the outer ring; and
at least one compressor provided with at least two rows of rotor blades, wherein at least one row of rotor blades is driven in a direction of rotation by the transmission shaft and at least one row of rotor blades is driven by the electric motor in a direction of rotation opposite the direction of rotation of the at least one row of rotor blades driven by the transmission shaft.

* * * * *